United States Patent [19]

Schluckbier

[11] 4,056,077
[45] Nov. 1, 1977

[54] MILKING UNIT DETACHER MECHANISM
[75] Inventor: Gary W. Schluckbier, Madison, Wis.
[73] Assignee: DEC International, Inc., Madison, Wis.
[21] Appl. No.: 709,650
[22] Filed: July 29, 1976
[51] Int. Cl.$^2$ .............................................. A01J 7/00
[52] U.S. Cl. ............................ 119/14.08; 119/14.13
[58] Field of Search ................. 119/14.08, 14.1, 14.13; 16/139, 140, 141, 144, 152, 153

[56] References Cited
U.S. PATENT DOCUMENTS

| 700,694 | 5/1902 | Marr | 16/152 |
|---|---|---|---|
| 3,929,103 | 12/1975 | Schluckbier | 119/14.08 |

Primary Examiner—Hugh R. Chamblee
Attorney, Agent, or Firm—Michael, Best & Friedrich

[57] ABSTRACT

A milking unit detacher mechanism including a main support column and a horizontally extending retractable milking unit support assembly mounted on the main column. The retractable support assembly is comprised of a plurality of link members pivotally connected to each other with the end link member pivotally connected to the main support column by a pivot pin to facilitate movement of the support assembly in its retract direction from underneath the cow and in its extended direction to the milking position underneath the cow. A biasing means is provided to create a biasing force on the end link member tending to rotate it towards its extended position. The biasing means includes a first cam sleeve rotatably mounted on the pivot pin and fastened to the main support column and a second cam sleeve fixedly mounted on the pivot pin adjacent the first cam sleeve. The first and second cam sleeves have cooperating cam surfaces on the adjacent ends thereof which operate when the sleeves are rotated with respect to each other to create the desired biasing force.

4 Claims, 6 Drawing Figures

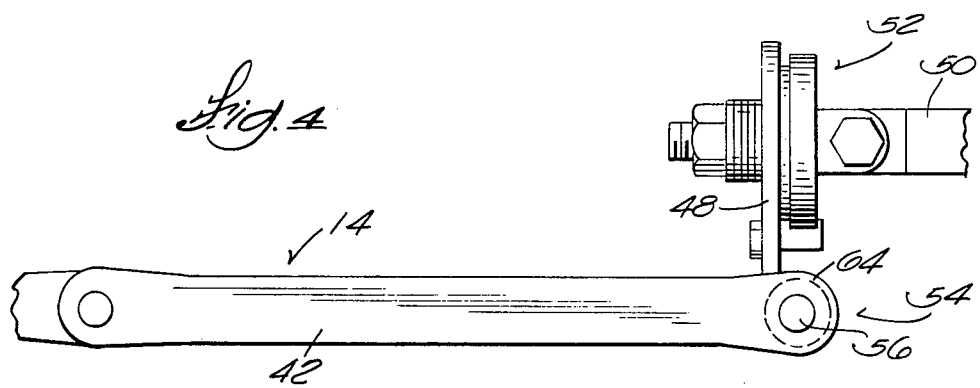
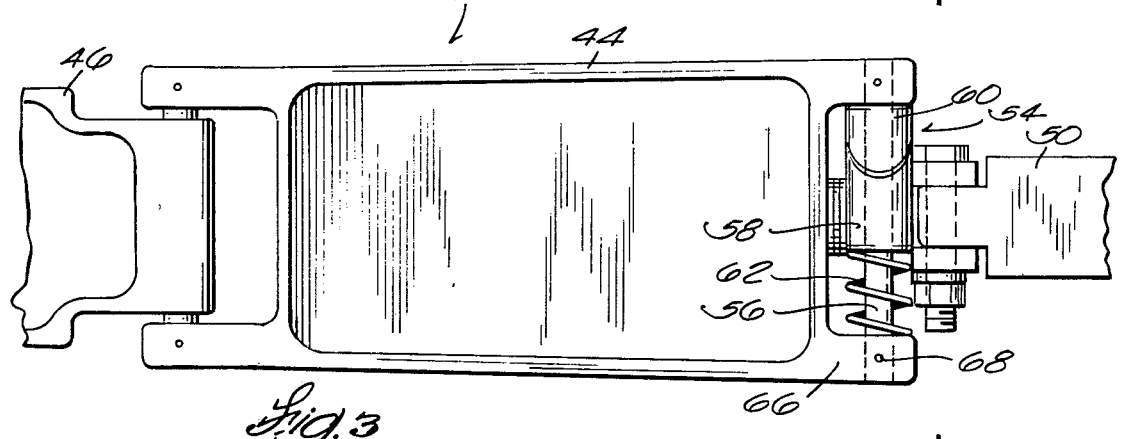
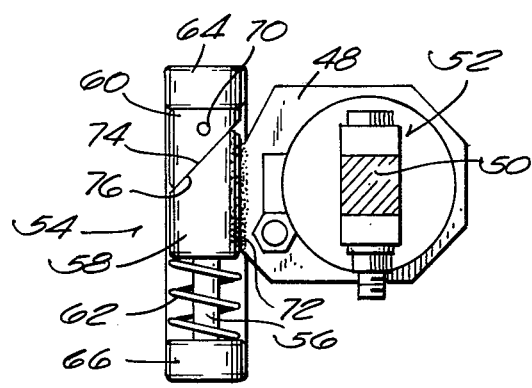
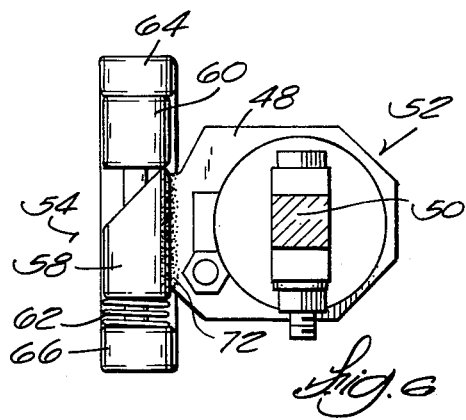

MILKING UNIT DETACHER MECHANISM

BACKGROUND OF THE INVENTION

I. Field of the Invention.

This invention relates to milking unit detacher mechanisms and more particularly to a mechanism which embodies a unique biasing mechanism for creating a biasing force tending to rotate the mechanisms towards its extended milking position under the cow.

II. Description of the Prior Art.

A prior mechanism of this general type is shown in U.S. Pat. No. 3,929,103. The mechanism shown therein does not provide a biasing mechanism of any type and thus is subject to a tendency of the retractable milker unit support mechanism to swing back from beneath the cow during the milking cycle. The subject matter herein eliminates this problem.

SUMMARY OF THE INVENTION

A milking unit detacher mechanism comprising a main support column and a vertically movable milker support column movably mounted thereon. A horizontally extending retractable milking unit support assembly is mounted on the milker support column and is adapted to support a milker unit thereon when the unit is connected to a cow for milking. The milker unit support assembly is further adapted to be retracted from its extended position underneath the cow to a retracted position adjacent the cow. Said support assembly is comprised of a plurality of link members pivotally connected to each other with the end link member pivotally connected to the vertically movable milker support column by a pivotal connection. The pivotal connection includes a pivot pin operatively connected to the link member and a biasing means operatively connected to the pivotal connection. The biasing means functions to create a rotating biasing force on the end link member in a direction towards its extended milking position. A flexible retract member is fastened at one end to the retractable milking support assembly and is operatively connected to a retract means which operates to pull on the flexible retract member and thereby cause the milker unit support assembly to be moved from its extended position to its retracted position.

DESCRIPTION OF THE DRAWINGS

FIG. 3 is a fragmentary side elevation view of the retractable milker unit support assembly for the detacher mechanism;

FIG. 4 is a top plan view of the mechanism shown in FIG. 3;

FIG. 5 is a sectional view taken along line 5—5 of FIG. 3; and

FIG. 6 is a view similar to FIG. 5 but with the end link of the support assembly pivoted 90° from its fully extended position. de

DESCRIPTION OF THE PREFERRED EMBODIMENT

Figure 1:
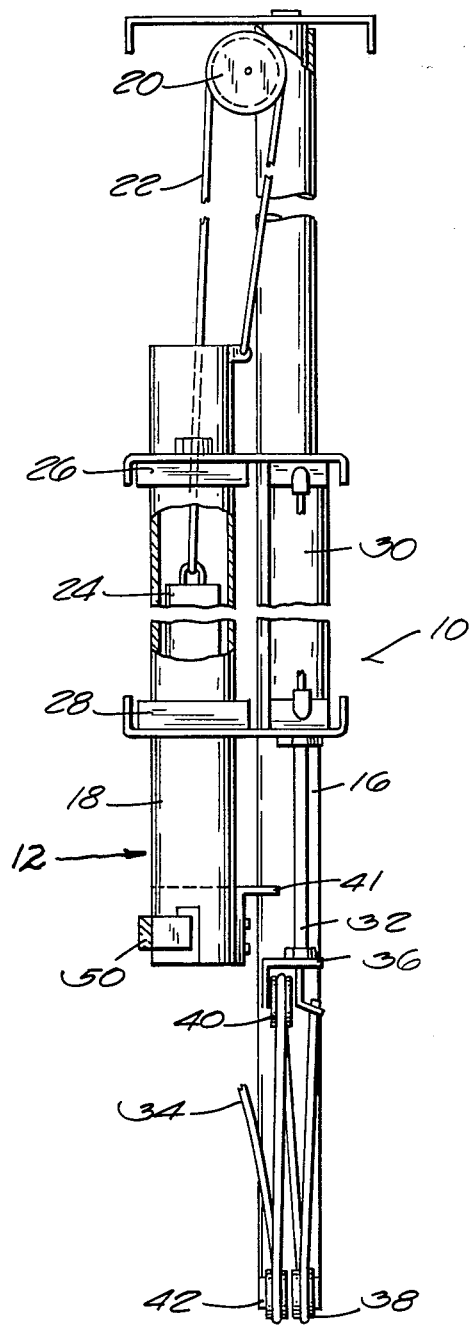
FIG. 1 is a front elevation view (with parts broken away) of the detacher mechanism of the present invention.

Referring to the drawings in detail, the detacher mechanism which is indicated generally by reference numeral 10 (FIGS. 1 and 2) is adapted to be used with a milking apparatus of suitable design (not shown).

The detacher mechanism 10 is comprised of two basic subassemblies, namely a vertical column assembly 12 (FIGS. 1 and 2), and a horizontally extending retractable milker unit support assembly 14 (shown partially in FIG. 3) mounted at the lower end of the column assembly 12.

Vertical column 12 is comprised of a stationary main support column 16 and a vertically adjustable milker support column 18 mounted on column 16. Main support column 16 is mounted adjacent a milking stall by any suitable support structure (not shown) and adjustable column 18 is supported from above on a pulley 20 rotatably mounted on the upper end of a support column 16. Column 18 is supported on pulley 20 by a cable 22 and a counterweight 24. The vertical movement of column 18 is guided by a pair of guide brackets 26, 28.

Figure 2:
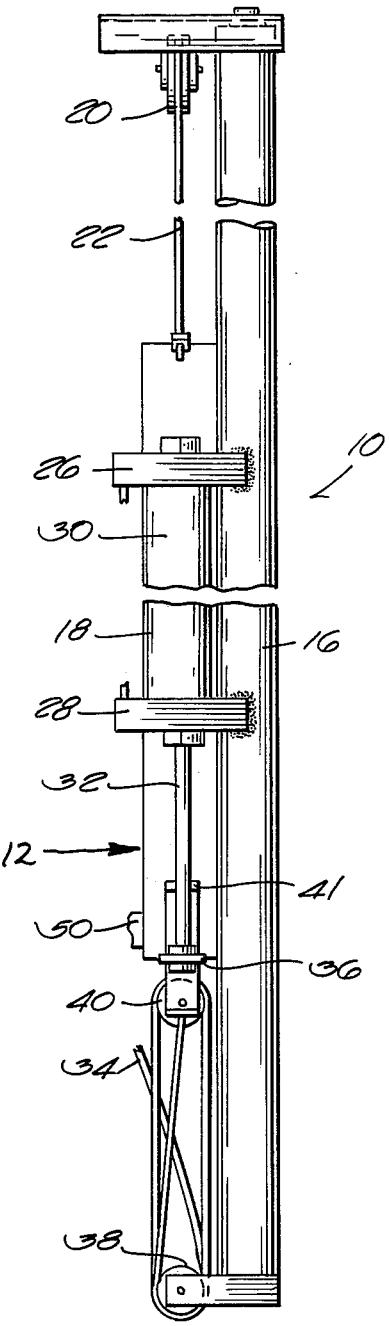
FIG. 2 is a side elevation view of the detacher mechanism shown in FIG. 1.

As best shown in FIG. 1, one end of cable 22 is attached to the upper end of column member 18 and the cable is wound around pulley 20 with the other end of the cable attached to counterweight 24 which in turn is mounted for reciprocal sliding movement inside column 18.

The detacher mechanism is powered by a pneumatic cylinder 30 mounted on main support column 16. Cylinder 30 is of a double acting type having a piston rod 32 connected at its lower end to a flexible retract member 34 which in turn is operatively connected to retractable milker support assembly 14. The specific operative relationship between member 34 and assembly 14 is not a part of the present invention and is thus not described in detail herein. One specific arrangement suitable for use in the present invention is described in U.S. Pat. No. 3,929,103. For purpose of the present invention it is sufficient to state that when flexible member 34 is pulled upwardly by cylinder 30, the retractable milker support assembly 14 will be actuated from its extended milking position under the cow to its retracted position adjacent the cow.

Flexible member 34 is anchored at one end to a bracket 36 fastened to the end of piston rod 32. From there it extends downwardly and is wound around a pulley 38 and then extends upwardly and is wound around a pulley 40 and then extends downwardly and is wound around a pulley 42 from which it extends upwardly for connection to support assembly 14. Pulley 40 is mounted on bracket 36 and pulleys 38 and 42 are mounted on the end of stationary support column 16. It will be appreciated that upon energization of cylinder 30 in its retract direction flexible member 34 will be moved in its retract direction in an amount equal to three times the movement of piston rod 32. A bracket member 41 is mounted on the lower end of column 18 and is positioned for engagement by bracket 36 on piston rod 36 when the cylinder 30 is energized in its retract direction.

As partially shown in FIGS. 3 and 4 and as fully disclosed in U.S. Pat. No. 3,929,103, retractable milking support assembly 14 is comprised of a plurality of link members pivotally connected together, two of which link members 44 and 46 are shown in FIGS. 3 and 4. The end link member 44 is pivotally mounted on a bracket arm 48 which in turn is fastened to a second arm 50 by a nut, bolt, friction plate and spring washer assembly 52. Arm 50 is fastened to the lower end of support column 18 by any suitable means such as welding. The pivotal connection between end link 44 and support bracket 48 includes a unique biasing mechanism designated generally by reference numeral 54.

The friction assembly 52 connecting bracket 48 to bracket 50 serves as a friction clutch to permit relative rotation of the two brackets when a shock force is applied to the retractable link assembly 14. Thus, should a force be applied by a kick from a cow, for example, such force will be absorbed by assembly 52, causing bracket 48 to be rotated to thereby prevent damage to the mechanism which might otherwise occur. In such event the retractable link assembly 14 can be readily restored to its proper horizontal extending position by simply gripping the link assembly and firmly rotating it back to its proper horizontal position.

As previously indicated, it is desirable that there be some resistance to the tendency of arm assembly 14 to spring back from its extended milking position underneath the cow towards its retracted position adjacent the cow during the milking cycle. As will be explained, biasing mechanism 54 is designed to provide a biasing force acting to swing the support assembly 14 towards its fully extended milking position beneath the cow. The direction of such bias is shown by the arrow in FIG. 4.

The assembly 54 is comprised of a pivot pin member 56, a first cam sleeve 58, a second cam sleeve 60 and a compression spring 62. Pin member 56 is mounted in openings in extending ear portions 64, 66 on the end of link 44 and is fastened to the link 44 by a roll pin 68. First sleeve member 58 is fastened to bracket arm 48 by a weld 72 and second sleeve member 60 is in turn fastened to pin member 56 by a roll pin 70 (FIG. 5). Compression spring member 62 is mounted on the lower end of pin 56 between ear 66 and the bottom end of sleeve 58. As best shown in FIGS. 5 and 6, sleeve 58 is provided with an angled cam surface 74 at the top end thereof and sleeve 60 is provided with a cooperating angled cam surface 76 on the lower end thereof.

With reference to FIGS. 5 and 6 it will be appreciated that when the support assembly 14 is pivoted from its extended position FIG. 5 towards its retracted position (FIG. 6), the rotation of cam sleeve 60 with respect to cam sleeve 58 will force sleeve 58 to be slidably actuated axially with respect to pin 56, causing spring 62 to be compressed from the position shown in FIG. 5 to the position shown in FIG. 6. It will be appreciated that since bracket 48 and sleeve 58 are stationary, rotation of link 44 as described above will cause link 44 (and the rest of assembly 14) to be moved vertically upwardly.

To consider the reverse of the movement described above, it will be appreciated that the weight of assembly 14 combined with camming action between sleeves 58 and 60 will create a rotating biasing force on link 44 in a clockwise direction as indicated by the arrow in FIG. 4. The force of compression spring 62 on the bottom end of sleeve 58 will further contribute to this rotating biasing force. In this regard it should be noted that while it is desirable that compression spring 62 be used, such a spring is not essential to the useful operation of mechanism 54. This rotary biasing force on link 44 will in turn serve to bias the entire support assembly 14 towards its extended position and thus prevent any tendency of the support assembly and milker unit supported thereon from swinging back and out from underneath the cow during milking.

OPERATION

To initiate the milking cycle the assembly 14 is moved to extended position (FIGS. 3 and 4) manually by the operator. At the same time the operator adjusts the vertical position of assembly 14 by manually raising or lowering column 18 to the proper height for the cow to be milked. It will be appreciated that such vertical adjustment will cause a movement of counterweight 24 and that such counterweight will keep the column 18 at the desired elevation once it is set. The operator adjusts the vertical position of assembly 24 to a position wherein the milker unit is completely free floating with respect to the arm assembly 24, i.e. to a position wherein the unit is supported by the cow's udder.

The operator then attaches the teat cups and milking commences and the operator leaves. During milking, as previously explained, the biasing force of mechanism 54 serves to resist any tendency of the support assembly from pivoting back to its retracted position from underneath the cow. Thus, any tendency of the support assembly 14 to swing out from under the cow due to movement of the cow or any other reason is eliminated by the biasing mechanism 54.

Milking continues until the milk flow from the milker unit drops below a predetermined minimum at which time a milk flow sensor of suitable design will operate to energize cylinder 30, which in turn will cause the piston rod 32 to be raised. Simultaneously the vacuum to the milker unit will be shut off by any suitable control means to thereby facilitate release of the teat cups from the cow.

Initial upward movement of piston rod 32 will produce a retracting movement of flexible retract member 34 which in turn will cause the milker unit support assembly 14 and milker unit supported therefrom to start its retracting movement. In addition upward movement of the piston rod will cause bracket 36 attached to the end of the piston rod to engage bracket 41 attached to the end of column 18 which in turn will cause the column to be moved upwardly along with the piston rod. Such rising of the milker unit during its retraction from underneath the cow will tend to prevent the detached teat cups from falling down onto the ground area at the stall.

I claim:

1. A milking unit detacher mechanism comprising:
a main support column;
a vertically movable milker support column movably mounted on said main support column;
a horizontally extending retractable milking unit support assembly mounted on said milker support column, said retractable milker unit support assembly adapted to support a milker unit thereon when the milker unit is connected to a cow for milking, said milker unit support assembly further adapted to be retracted from its extended position underneath the cow to a retracted position adjacent the cow, said support assembly comprising a plurality of link members pivotally connected to each other with the end link member pivotally connected to said vertically movable milker support column by a pivotal connection, said pivotal connection including a pivot pin operatively connected to said end link member;
a biasing means operatively connected to said pivotal connection between said end link member and said milker support column, said biasing means functioning to create a rotating biasing force on said end link member in a direction towards its extended milking position, said biasing means including a first cam sleeve rotatably mounted on said pivot pin and fastened to said vertically movable support column, and a second cam sleeve fixedly mounted on said pivot pin adjacent said first cam sleeve, said first and second cam sleeves having cooperating cam surfaces on the adjacent ends thereof which operate when the sleeves are rotated with respect to each other to create a biasing force on said end link member tending to rotate it toward its extended position, said biasing means further including a compression spring mounted on said pivot pin and adapted to exert an axial biasing force on said first sleeve member in a direction towards said second sleeve member;

a flexible retract member fastened at one end to said retractable milking support assembly; and retract means for pulling on said flexible retract member to cause said milker unit support assembly to be moved from its extended position to its retracted position.

2. A milking unit detacher mechanism according to claim 1 in which said retract means includes a power cylinder, mounted on said main support column, and having a movable piston rod, said power cylinder being operatively connected to said flexible retract member and adapted when energized in its retract direction to pull on said flexible retract member.

3. A milking unit detacher mechanism according to claim 2 in which retract means further includes a first pulley mounted on the end of said piston rod and second and third pulleys mounted adjacent each other on the end of said main support column, said flexible retract member anchored at one end to the end of said piston rod and then extending downwardly therefrom around said second pulley and then upwardly and around said first pulley and then downwardly and around said third pulley so that said flexible member will be moved in its retract position in an amount equal to three times the amount of movement of said piston rod.

4. A milking unit detacher mechanism comprising:

a main support column;

a horizontally extending retractable milking unit support assembly mounted on said main support column, said retractable milker unit support assembly adapted to support a milker unit thereon when the milker unit is connected to a cow for milking, said milker unit support assembly further adapted to be retracted from its extended position underneath the cow to a retracted position adjacent the cow, said support assembly comprising a plurality of link members pivotally connected to each other with the end link member pivotally connected to said main support column by a pivotal connection, said pivotal connection including a pivot pin operatively connected to said link member;

a biasing means operatively connected to said pivotal connection between said end link member and said main support column, said biasing means functioning to create a rotary biasing force on said end link member in a direction towards its extended milking position, said biasing means including a first cam sleeve rotatably mounted on said pivot pin and fastened to said main support column, and a second cam sleeve fixedly mounted on said pivot pin adjacent said first cam sleeve, said first and second cam sleeves having cooperating cam surfaces on the adjacent ends thereof which operate when the sleeves are rotated with respect to each other to create a biasing force on said link member tending to rotate it towards its extended position, said biasing means further including a compression spring mounted on said pivot pin and adapted to exert an axial biasing force on said first sleeve member in a direction towards said second sleeve member.

* * * * *